United States Patent
Landy

(10) Patent No.: US 11,007,464 B1
(45) Date of Patent: May 18, 2021

(54) PORTABLE AIR FILTRATION AND AIR DISPERSION SYSTEM AND METHOD

(71) Applicant: Germfree Laboratories INC, Ormond Beach, FL (US)

(72) Inventor: Craig E. Landy, Ormond Beach, FL (US)

(73) Assignee: GERMFREE LABORATORIES INC, Ormond Beach, FL (US)

( * ) Notice: Subject to any disclaimer, the term of this patent is extended or adjusted under 35 U.S.C. 154(b) by 0 days.

(21) Appl. No.: 17/095,388

(22) Filed: Nov. 11, 2020

Related U.S. Application Data

(60) Provisional application No. 63/059,642, filed on Jul. 31, 2020.

(51) Int. Cl.
*B01D 46/00* (2006.01)
*B01D 46/46* (2006.01)
*F24F 8/108* (2021.01)
*B01D 46/52* (2006.01)

(52) U.S. Cl.
CPC ..... *B01D 46/0049* (2013.01); *B01D 46/0028* (2013.01); *B01D 46/46* (2013.01); *F24F 8/108* (2021.01); *B01D 46/521* (2013.01); *B01D 2273/30* (2013.01); *B01D 2279/65* (2013.01)

(58) Field of Classification Search
CPC ............ B01D 46/0049; B01D 46/0028; B01D 2273/30; B01D 2279/65; F24F 1/02; F24F 3/1603; F24F 13/20; F24F 7/065; F24F 8/108; F24F 8/10
See application file for complete search history.

(56) References Cited

U.S. PATENT DOCUMENTS

| | | | |
|---|---|---|---|
| 3,308,634 A * | 3/1967 | Smith | F24F 13/20 62/263 |
| 4,210,429 A * | 7/1980 | Golstein | A61L 9/20 422/121 |
| 6,503,458 B1 * | 1/2003 | Ogle | A61L 9/12 422/120 |

(Continued)

FOREIGN PATENT DOCUMENTS

CN 205279344 U * 6/2016

OTHER PUBLICATIONS

English Abstract of CN 205279344 U (Year: 2016).*

(Continued)

*Primary Examiner* — Robert Clemente
(74) *Attorney, Agent, or Firm* — Talem IP Law, LLP

(57) ABSTRACT

An air filtration device including a housing that includes an air intake and a blower motor mounted within the housing, wherein when the blower motor is in operation, the blower motor generates an air flow from the air intake through an air duct extending vertically from the housing. The air filtration device also includes an air outlet at a distal end of the air duct, wherein the air outlet comprises at least one aperture, wherein when the blower motor is in operation, the air outlet discharges the air flow in a horizontal plane over an occupied zone from a region of the air duct having a vertical height that is less than or equal to twelve inches, wherein the region of the air duct for the air outlet is disposed at least thirty-six inches above the air intake. The air filtration device also includes an air filter.

19 Claims, 11 Drawing Sheets

(56) References Cited

U.S. PATENT DOCUMENTS

| | | | |
|---|---|---|---|
| 8,246,317 B2 | 8/2012 | Gammack | |
| 8,403,640 B2 | 3/2013 | Gammack et al. | |
| 8,708,650 B2 | 4/2014 | Crawford et al. | |
| 8,784,071 B2 | 7/2014 | Gammack | |
| 9,797,414 B2 | 10/2017 | Hodgson et al. | |
| 10,145,388 B2 | 12/2018 | Simmonds et al. | |
| 2006/0169141 A1* | 8/2006 | Yuen | A61L 9/205 96/16 |
| 2013/0243588 A1* | 9/2013 | Lo | F24F 7/065 415/211.2 |
| 2017/0191684 A1* | 7/2017 | Tompkins | A47C 21/044 |

OTHER PUBLICATIONS

The Whynter Store, "Whynter ARC—14S 14,000 BTU Dual Hose Portable Air Conditioner, Dehumidifier, Fan with Activated Carbon Filter Plus Storage Bag for Rooms up to 500 sq ft, Platinum and Black", https://www.amazon.com/Whynter-ARC-14S-Conditioner-Dehumidifier-Activated/dp/B0028AYQDC/ref=asc_df_B0028AYQDC/?tag=hyprod-20&linkCode=df0&hvadid=167119222542&hvpos=&hvnetw=g&hvrand=8382814526234314566&hvpone=&hvptwo=&hvqmt=&hvdev=c&hvdvcmdl=&hvlocint=&hvlocphy=9012345&hvtargid=pla-272538169420&psc=1, Retrived on Nov. 12, 2020, 13 Pages.

Grainger, "Portable Air Cleaners", https://www.grainger.com/category/hvac-and-refrigeration/air-treatment/air-cleaners?cm_sp=Product_Details-_-Categories_Based_on_Your_Search-_-IDPPLACAT, Retrieved on Nov. 12, 2020, 5 Pages.

Grainger, "Dyson Air Purifier, Number of Speeds 10, Voltage 120, 60 Hz, Silver, Item # 60CY19, Mfr. Model # DP04", https://www.grainger.com/product/DYSON-Air-Purifier-60CY19, Retrieved on Nov. 12, 2020, 2 Pages.

Grainger, "Dyson Air Purifier, Number of Speeds 10, Voltage 120, 60 Hz, Silver, Item # 60CY17, Mfr. Model # TP04", https://www.grainger.com/product/DYSON-Air-Purifier-60CY17?cm_sp=Product_Details-_-Customer_Also_Viewed-_-AZIDPRR_RRAD-040120&cm_vc=AZIDPRR_RRAD-040120&req=Customer_Also_Viewed&opr=AZIDPRR_RRAD-040120, Retrieved on Nov. 12, 2020, 2 Pages.

Pure Air Systems, "Air Filter Systems Product Catalog", https://www.pureairsystems.com/air-filter-systems/, Retrieved on Nov. 12, 2020, 5 Pages.

\* cited by examiner

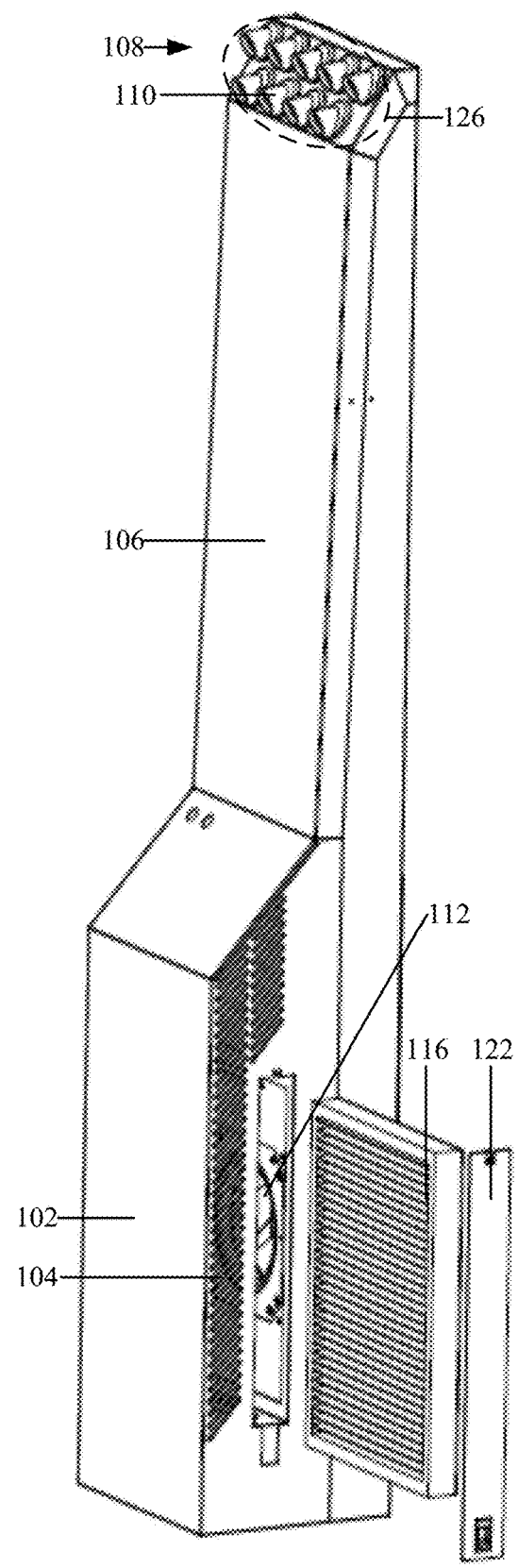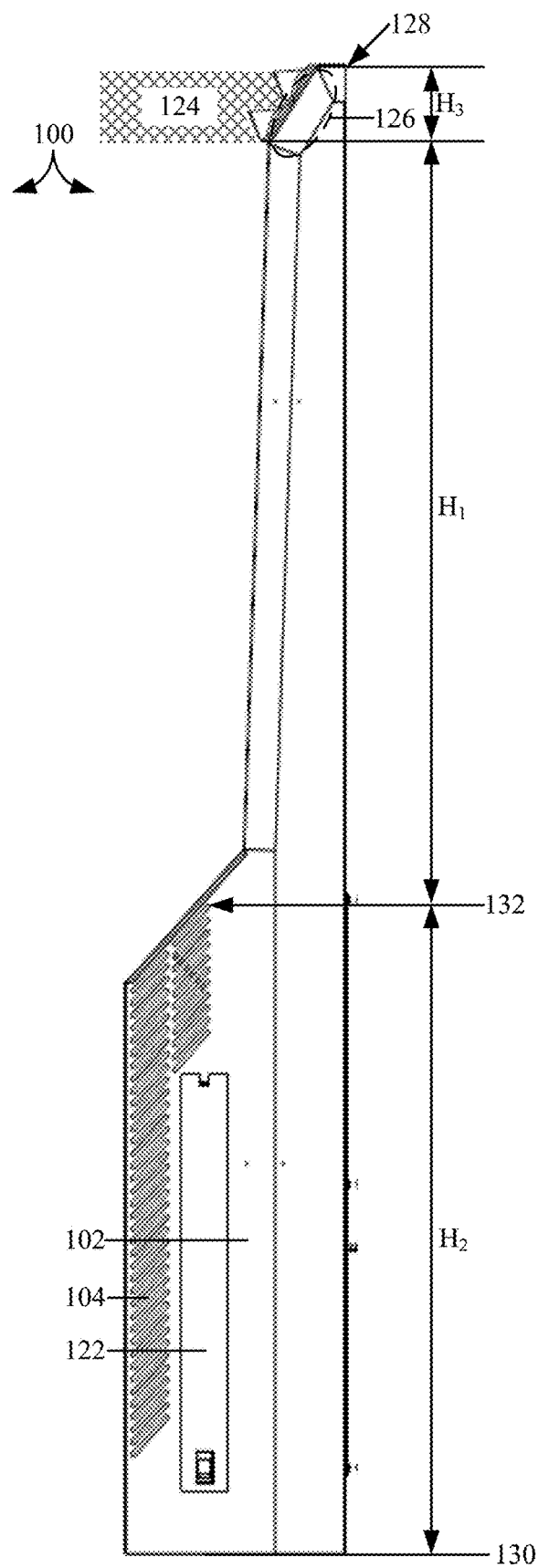
Figure 1C
Figure 1D

PORTABLE AIR FILTRATION AND AIR DISPERSION SYSTEM AND METHOD

BACKGROUND

Airborne dissemination of pathogens, including bacteria and viruses, through air occurs through droplets and aerosols that are generated by sneezing, coughing, breathing, talking, shouting, singing, among other modes of transmission. Pre-COVID-19, illness and disease resulting from the spread of these pathogens cost the United States economy hundreds of billions of dollars a year and due to the spread of COVID-19, has cost the US economy many trillions of dollars in 2020. Small (e.g., less than 10 µm) and medium (e.g., 10 µm-100 µm) sized particles can travel beyond the current recommended social distance of 6 feet or greater. In stale air conditions, a sized 10 µm droplet can take over eight minutes to settle; smaller particles or droplet nuclei can take hours or longer to settle. Furthermore, airflows created by people, movement of materials, and heating, ventilation, and air conditioning (HVAC) systems can increase this time.

Spread of some pathogens, including SARS-CoV-2/Covid-19, have been shown to be greatly increased in indoor settings, particularly those without adequate fresh-air ventilation, including, but not limited to, shops, offices, schools, libraries, restaurants, cruise ships, elevators, conference rooms, and public transportation. Instead of fresh air ventilation, these spaces rely on HVAC systems that use mostly recycled air for energy/cost savings. Some of these spaces do not have windows or doors that can be opened and opening windows or doors (in spaces that actually have them) would wipe out any energy/cost savings and may also not be feasible due to the surrounding climate. Removing small and medium sized particles/droplets carrying pathogens by installing an adequate filter (e.g., MERV-13 or higher) to existing systems often fails to be useful due to a variety of issues, including, but not limited to, lower volumetric rates of air (e.g., measured in cubic feet per minute (CFM)), higher burdens on the motor/pump, costly alterations to the HVAC system to install an adequate filter, and air patterns/flows created by the existing HVAC system that can increase the risk of contamination from particles, such as cross-contamination of clean and dirty air patterns/flows (e.g., a healthy person can be in the downstream air flow of a sick person), turbulent mixing of clean and contaminated air, and dead air zones. Indeed, HVAC systems were designed to heat and cool air as well as protect the system itself. Due to the different HVAC systems themselves as well as the differences in the buildings the HVAC systems are installed in, all HVAC systems suffer from their own set of problems for providing safe and efficient clean air to people across an entire room. The HVAC systems for these spaces may be modified to increase fresh-air/clean-air ventilation; however, this can be very expensive, complex, and take a relatively long time to modify.

Existing personal air filtration devices and systems suffer from a variety of problems, including, but not limited to, air recirculation in the occupied zone of air, low airflow and/or velocity, and improper positioning of the air intake (e.g., receiving dirty air) and/or air outlet (e.g., discharging clean air), which can result in the resuspension of droplets that have already fallen below the occupied zone of air. Furthermore, masks, shields, and other personal protective equipment used for preventing the spread of bacteria and/or viruses that are spread through droplets and aerosols require user compliance; some people may not be able to comply due to underlying health conditions, other people find PPE uncomfortable, and some people do not want to comply because they are not concerned about the risk of pathogens. Therefore, there exists a need for a portable air filtration and air dispersion systems and methods, particularly where people are sharing enclosed spaces.

BRIEF SUMMARY

Portable air filtration and air dispersion systems and methods are provided. Air with small and medium sized droplets that contain pathogens (e.g., "dirty air"), such as droplets carrying SARS-CoV-2/Covid-19, can be cleaned using the described air filtration and air dispersion systems and methods. Advantageously, the described portable air filtration and air dispersion systems and methods provide clean air across an entire room via air mixing zones while minimizing and/or preventing air recirculation and/or cross-contamination in the occupied zone. Indeed, the described air filtration device provides safe, clean air without requiring active protection compliance from users.

An air filtration device includes a housing including an air intake, and a blower motor mounted within the housing. When the blower motor is in operation, the blower motor generates an air flow from the air intake through an air duct extending vertically from the housing. The air filtration device further includes an air outlet at a distal end of the air duct. The air outlet includes at least one aperture. In some cases, the at least one aperture is disposed such that when the blower motor is in operation, the air outlet discharges the air flow in a horizontal plane over an occupied zone from a region of the air duct having a vertical height that is less than or equal to twelve inches. In some cases, the region of the air duct for the air outlet is disposed at least thirty-six inches above the air intake. The air filtration device further includes an air filter mounted within the housing between the air intake and the air outlet.

In some cases, a top of the air filtration device is between seventy-eight inches to ninety-six inches from a bottom of the air filtration device. In some of these cases, the air outlet is positioned within twelve inches from the top of the air filtration device. In some of these cases, a top of the air intake is positioned forty-two inches from a bottom of the air filtration device.

In some cases, the blower motor generates an air flow of at least 350 cubic feet per minute (CFM). In some of these cases, the at least one aperture of the air outlet discharges the air flow having a velocity of at least 1,200 feet per minute (FPM) in the horizontal plane. In some cases, the at least one aperture is configured to provide volumetric adjustment of the air flow. In some cases, a portion of the air duct is made of a semi-porous fabric. In some cases, the air filtration device further includes a blower motor controller that can turn the blower motor on and off. In some cases, the air filtration device further includes an infrared sensor. The infrared sensor sends a signal to a blower motor controller and the blower motor controller determines whether a number of people present is more than a recommended number of people present based on the signal. In response to determining that the number of people present is more than the recommended number of people present based on the signal, turning the blower motor to a room purge mode.

In some cases, the at least one aperture of the air outlet is at least one nozzle. In some cases, the at least one nozzle is configured to provide directional adjustment of the air flow. In some cases, the at least one nozzle includes a plurality of nozzles in a bottom row and a plurality of nozzles in a top row. In some cases, ends of the plurality of nozzles in the bottom row are positioned between a two to eighteen-degree downward angle from horizontal. In some cases, the vertical height from the bottom row to the top row is less than or equal to six inches.

BRIEF DESCRIPTION OF THE DRAWINGS

FIGS. 1A-1E illustrate views of a portable air filtration device. FIG. 1A illustrates a right side-angled view of the portable air filtration device; FIG. 1B illustrates a left side-angled view of the portable air filtration device; FIG. 1C illustrates a left side-angled view of the portable air filtration device with a left-side filter replacement; FIG. 1D illustrates a left side view of the portable air filtration device; and FIG. 1E illustrates an exploded view of internal components of the portable air filtration device.

FIG. 3A illustrates a left side view of the circular nozzle; FIG. 3B illustrates a left side-angled view of the circular nozzle; FIG. 3C illustrates a front view of the circular nozzle; and FIG. 3D illustrates a front view of the circular nozzle having a valve.

FIG. 4A illustrates a left side view of the rectangular nozzle; FIG. 4B illustrates a left side-angled view of the rectangular nozzle; FIG. 4C illustrates a front view of the rectangular nozzle; and FIG. 4D illustrates a front view of the rectangular nozzle having a valve.

DETAILED DESCRIPTION

Portable air filtration and air dispersion systems and methods are provided. Air with small and medium sized droplets that contain pathogens (e.g., "dirty air"), such as droplets carrying SARS-CoV-2/Covid-19, can be cleaned using the described air filtration and air dispersion systems and methods. Advantageously, the described portable air filtration and air dispersion systems and methods provide clean air across an entire room via air mixing zones while minimizing and/or preventing air recirculation and/or cross-contamination in the occupied zone. Indeed, the described air filtration device provides safe, clean air without requiring active protection compliance from users.

As used herein, an "occupied zone" refers to a horizontal cross-section of air that people live in (e.g., the relative height of people to the ground). In other words, the occupied zone refers to a horizontal cross-section of air that ranges from the height of people that will be utilizing an air filtration device to the ground. As an example, the occupied zone may be a horizontal cross-section of air that is seventy-eight inches tall, which would include 99.9% of the US population.

As used herein, "cross-contamination" refers to undesirable mixing of clean with dirty air in the occupied zone. An example of cross-contamination is described with respect to FIG. 2A.

As used herein, an "adequate air throw" refers to a minimum velocity of an air flow as the air flow is discharged from an air outlet over an occupied zone. In some cases, the minimum velocity of the air flow is 500 FPM. In some cases, the minimum velocity of the air flow is 750 FPM. In some cases, the minimum velocity of the air flow is 1,000 FPM. In some cases, the minimum velocity of the air flow is 1,200 FPM. In some cases, the minimum velocity of the air flow is 1,500 FPM. In some cases, the minimum velocity of the air flow is 2,000 FPM. In some cases, the minimum velocity of the air flow is 2,500 FPM. In some cases, the minimum velocity of the air flow is 3,000 FPM. It should be understood that the velocity of the air flow may be higher than the minimum velocity value, but would be considered to have adequate air throw of at least that minimum velocity value. In some cases, an adequate air throw further includes a minimum air speed of at least 50 FPM twenty feet away from the air filtration device.

As used herein, an "air mixing zone" refers to a zone in which a majority of clean air discharged from the air filtration and air dispersion device mixes with potentially dirty air above an occupied room/space, with any mixing of clean air discharged from the air filtration and air dispersion device with potentially dirty that occurs within the occupied zone having no air currents that exceed 40 FPM.

As used herein, a "horizontal plane" refers to an imaginary plane that can be considered to be a slice of space parallel to the ground and that contains a vertical height.

Figure 1A:
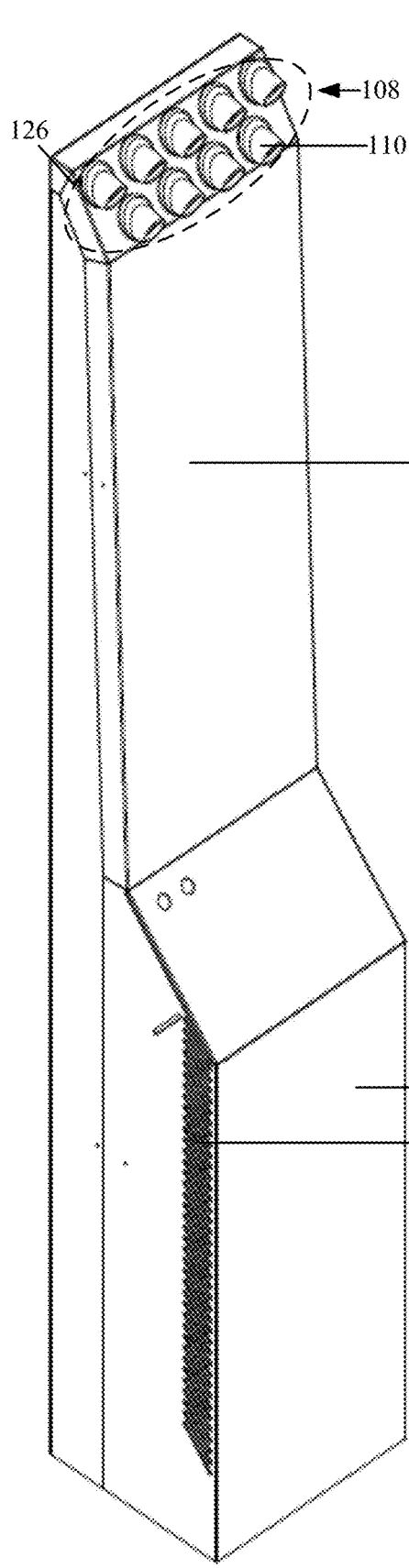
Figure 1B:
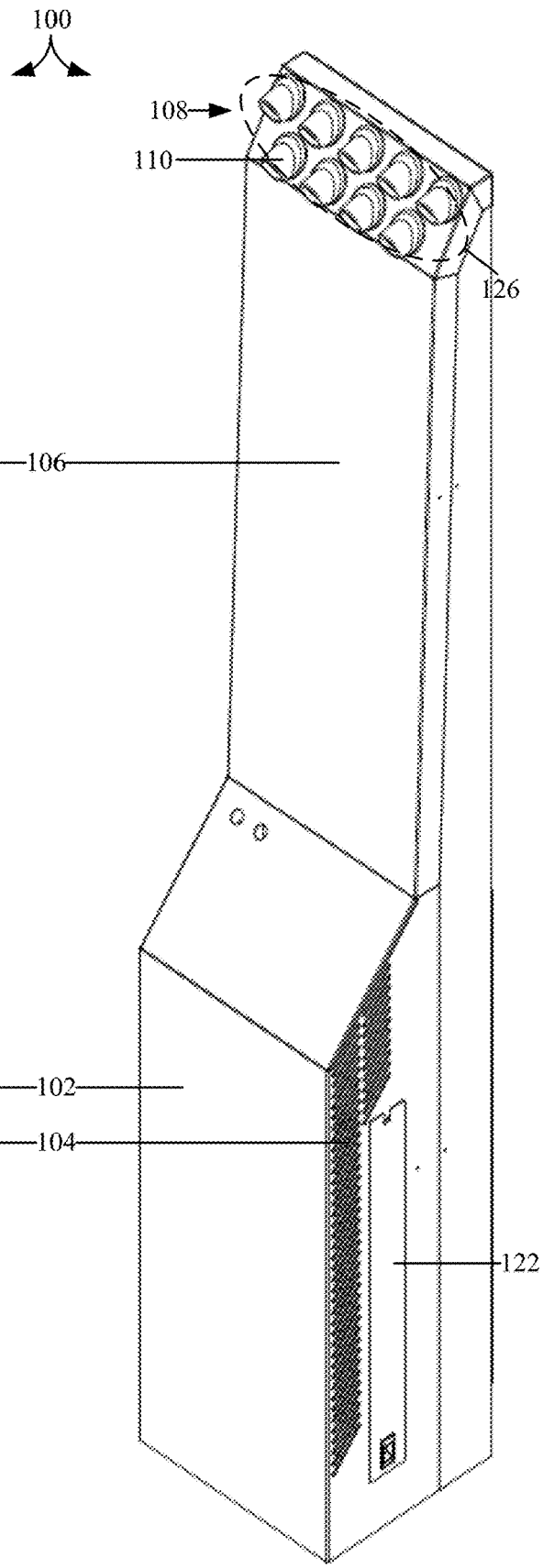
Figure 1E:
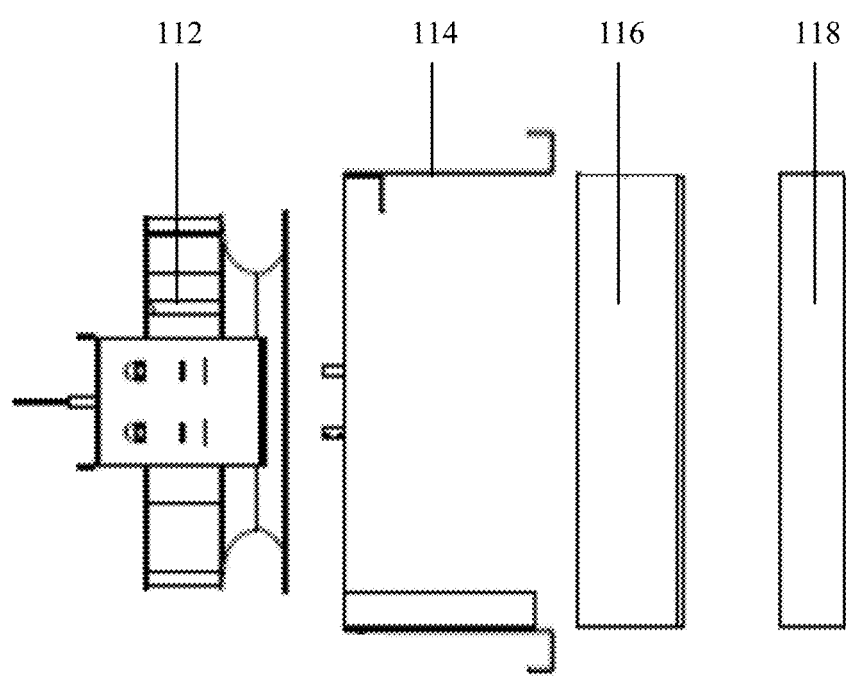

FIGS. 1A-1E illustrate views of a portable air filtration device. FIG. 1A illustrates a right side-angled view of the portable air filtration device; FIG. 1B illustrates a left side-angled view of the portable air filtration device; FIG. 1C illustrates a left side-angled view of the portable air filtration device with a left-side filter replacement; FIG. 1D illustrates a left side view of a portable air filtration device and FIG. 1E illustrates an exploded view of internal components of the portable air filtration device. Referring to FIGS. 1A-1E, an air filtration device 100 includes a housing 102 having an air intake 104, an air duct 106 that extends vertically from the housing 102, and an air outlet 108 that is positioned at a distal end of the air duct 106. The air outlet 108 includes at least one aperture 110. The air filtration device 100 further includes a blower motor 112 mounted within the housing 102. In some cases, the blower motor 112 is mounted via a blower motor bracket 114. The air filtration device 100 further includes an air filter 116 mounted within the housing 102 between the air intake 104 and the air outlet 108. In some cases, a pre-filter 118 is included between the air intake 104 and the air filter 116 to prevent damage to the air filter 116. In some cases, the pre-filter 118 and/or the air filter 116 is mounted/positioned via the blower motor bracket 114. In some cases, a perforated blower guard is mounted downstream of the motor to prevent damage to the blower motor 112. In some cases, a filter door 122 is included on a side of the housing 102 for ease of replacing a used air filter with a new air filter.

When used in a space having air-borne pathogens, the air filtration device 100 pulls dirty air (e.g., air having small and medium sized droplets and droplet nuclei carrying pathogens) in via the air intake 104, through the air filter 116 and into the blower motor 112, which pushes the now clean air (e.g., having a majority of the small and medium sized droplets and droplet nuclei carrying air-borne pathogens removed) through the air duct 106 and out of the air outlet 108.

The air flow is created via the blower motor 112. Specifically, the blower motor 112 generates an air flow from the air intake 104 through the air duct 106, and out of the air outlet 108. In some cases, the air outlet 108 discharges the air flow in a horizontal plane 124 over an occupied zone from a region 126 of the air duct 106 having a vertical height that is less than or equal to twelve inches. In some cases, the air outlet 108 discharges the air flow in a horizontal plane 124 over an occupied zone from a region 126 of the air duct 106 having a vertical height (e.g., illustrated as $H_3$ in FIG. 1D) that is less than or equal to two, four, six, eight, or ten inches. The vertical height $H_3$ of the region 126 is determined based on the size, shape, and features of the at least one aperture 110 relative to the desired minimum volume and the minimum velocity of air flow for that air filtration device 100. Certain considerations for configuring the air outlet are further described with respect to FIG. 4A. Due to the discharge of a high velocity air flow in a horizontal plane 124 over an occupied zone (e.g., an adequate air throw), clean air is distributed across a room without cross-contamination. Indeed, the clean air "falls" into the occupied zone, creating clean air mixing zones that provide clean air to people across the room (as described in more detail with respect to FIG. 2B).

The region 126 of the air duct 106 for the air outlet 108 is disposed at least thirty-six inches ($H_1$) above a top 132 of the air intake 104. In some cases, the region 126 of the air duct 106 for the air outlet 108 is disposed at least forty, forty-two, forty-four, forty-six, forty-eight, fifty, fifty-two, fifty-four, fifty-six, fifty-eight, or sixty inches ($H_1$) above the air intake 104. In some cases, the region 126 of the air duct 106 for the air outlet 108 contains a face holder to support an interchangeable face for an air outlet to allow for various configurations of air outlets (e.g., such as those described with respect to FIGS. 4A and 4B).

A top 128 of the air filtration device 100 is between seventy-eight to ninety-six inches (e.g., $H_1+H_2+H_3$) above a bottom 130 of the air filtration device 100. In some cases, a top 128 of the air filtration device 100 is seventy-eight inches above a bottom 130 of the air filtration device 100. In some cases, a top 128 of the air filtration device 100 is eighty-four inches above a bottom 130 of the air filtration device 100. In some cases, a top 128 of the air filtration device 100 is ninety inches above a bottom 130 of the air filtration device 100. In some cases, a top 128 of the air filtration device 100 is ninety-six inches above a bottom 130 of the air filtration device 100.

The height ($H_2$) of the air intake 104 above a bottom 130 of the air filtration device 100 may vary depending upon the height at which people will be living/breathing in that space. For example, in a room where people are generally sitting and/or very short (e.g., a kindergarten classroom), a top 132 of the air intake 104 may be no higher than eighteen inches ($H_2$) above a bottom 130 of the air filtration device 100. As another example, in a room where people are generally standing and/or very tall (e.g., a locker room for a professional basketball team), a top 132 of the air intake 104 may be no higher than forty-eight inches ($H_2$) above a bottom 130 of the air filtration device 100. In other cases, height ($H_2$) of a top 132 of the air intake 104 to the bottom 130 of the air filtration device 100 may be any height between eighteen inches and forty-eight inches (e.g., twenty-four inches, thirty inches, thirty-six inches, or forty-two inches).

In some cases, the air intake 104 is positioned vertically underneath internal components of the air filtration device (as opposed to horizontally as illustrated in FIGS. 1A-1D), such that the dirty air is received below the internal components (e.g., internal components described with respect to FIG. 1E) of the air filtration device 100. Appropriate modifications to the housing 102 would be required to accommodate a vertical air intake. In cases in which the air intake 104 is positioned vertically, the air intake 104 would be forty-two inches or less (e.g., thirty-six inches or thirty inches or twenty-four inches) above a bottom 130 of the air filtration device 100.

In some cases, the air filter 116 is a MERV 13 air filter. In some cases, the air filter 116 is a MERV 13, 14, 15, or 16 air filter. In some cases, the air filter 116 is a MERV 17 air filter or higher. In some cases, the air filter 116 is a HEPA air filter. In some cases, the air filter 116 is an ULPA air filter. It should be understood that the air filter 116 may be any suitable air filter that provides an acceptable level of reduction of pathogens from the air flow. In some cases, the air filter 116 may include multiple air filters in series (e.g., a MERV 12 air filter followed by a MERV 16 air filter downstream). In some cases, ultraviolet light may be incorporated to disinfect the internal components of the air filtration device 100.

In some cases, the blower motor 112 may be a backward curved centrifugal fan. The blower motor 112 may also be (in addition to or separately) an electronically commutated motor (ECM). In some cases, the backward curved centrifugal fan is an Ecofit Q13-A7-1 Backward Curved Centrifugal Fan (Size 250×50). The Ecofit Q13-A7-1 Backward Curved Centrifugal Fan provides 508.5 CFM (e.g., volume) and about 320 pascals (e.g., pressure) at its maximum efficiency point. It should be understood that any blower motor that can provide the minimum volume and the minimum velocity of air flow through the air outlet can be used. Furthermore, it should also be understood that the configuration of the air outlet (e.g., size, shape, direction, and number of apertures/nozzles) may also influence the selection of the fan needed to provide the minimum volume and the minimum velocity required. In some cases, the minimum volume of airflow is at least 350 CFM. In some cases, the minimum volume of airflow is at least 400, 450, or 500 CFM. In some cases, the minimum volume of airflow is at least 1000 CFM. In some cases, the minimum volume of airflow is greater than 1000 CFM. In some cases, the minimum velocity of air flow 500 FPM. In some cases, the minimum velocity of air flow 1,200 FPM. In some cases, the minimum velocity of the air flow is at least 500 FPM. In some cases, the minimum velocity of the air flow is at least 750, 1000, 1,200, 1,500, 2,000, 2,500, or 3,000 FPM. It should be understood that the actual velocity of the air flow may be higher than the minimum.

In some cases, the air filtration device 100 includes a room purge mode for increased volume of air flow. A room purge mode increases the average volume of air flow by 1.5 to 3 times. Therefore, an ECM as the blower motor 112 can be advantageous in implementing a room purge mode. In some cases, a room purge mode is applied to increase the average volume of air flow by at least 1.5 times. In some cases, a room purge mode is applied to increase the average volume of air flow by at least 2 times. In some cases, a room purge mode is applied to increase the average volume of air flow by at least 2.5 times. In some cases, a room purge mode is applied to increase the average volume of air flow by at least 3 times. The increased volume of (clean) air flow from the air filtration device 100 can be especially advantageous in situations where an increased number of people than is recommended per health and safety guidelines are occupying the space; or in situations such as in between shifts/classes. For instance, most high schools and colleges have ten minutes in between classes. However, it usually takes a few minutes for students and/or professors/teachers from the previous class to leave the room and for students and professors/teachers for the next class to enter the room. Therefore, in order to ensure maximum reductions of pathogens from the air without increasing the amount of time in between classes, a room purge mode can be initiated to expedite filtering of the air in the room.

In some cases, a sensor (e.g., an infrared sensor) may be added to the air filtration device 100 (and be coupled to the computing device 700 of FIG. 7) to detect people in the space/room (e.g., quantity of people and/or space taken up). That information can then be sent to a controller (e.g., computing device 700) that, upon determining whether the number of people is within recommended limits, over recommended limits, or there are no people at all, turn on the blower motor (e.g., if the number of people are within recommended limits), initiate a room purge mode (e.g., if the number of people are over recommended limits), or turn the blower motor off (e.g., if there are no people at all). In cases where it is determined that the number of people are over recommended limits, an increased risk indicator light may be initiated in addition to or in lieu of the initiation of a room purge mode. In some cases, a pressure drop sensor or an hour meter may also be added to the air filtration device 100 (and be coupled to the computing device 700 of FIG. 7) to determine air filter lifetime and a visual indication can be provided based on that signal that the air filter needs to be replaced. For example, a change air filter indicator light may be initiated when pressure created by the blower motor drops below a certain amount (as measured by a pressure drop sensor). In other cases, a change air filter indicator light may be initiated when the number of hours the blower motor has been run reaches a predetermined number of hours (as measured by an hour meter).

Figure 2A:
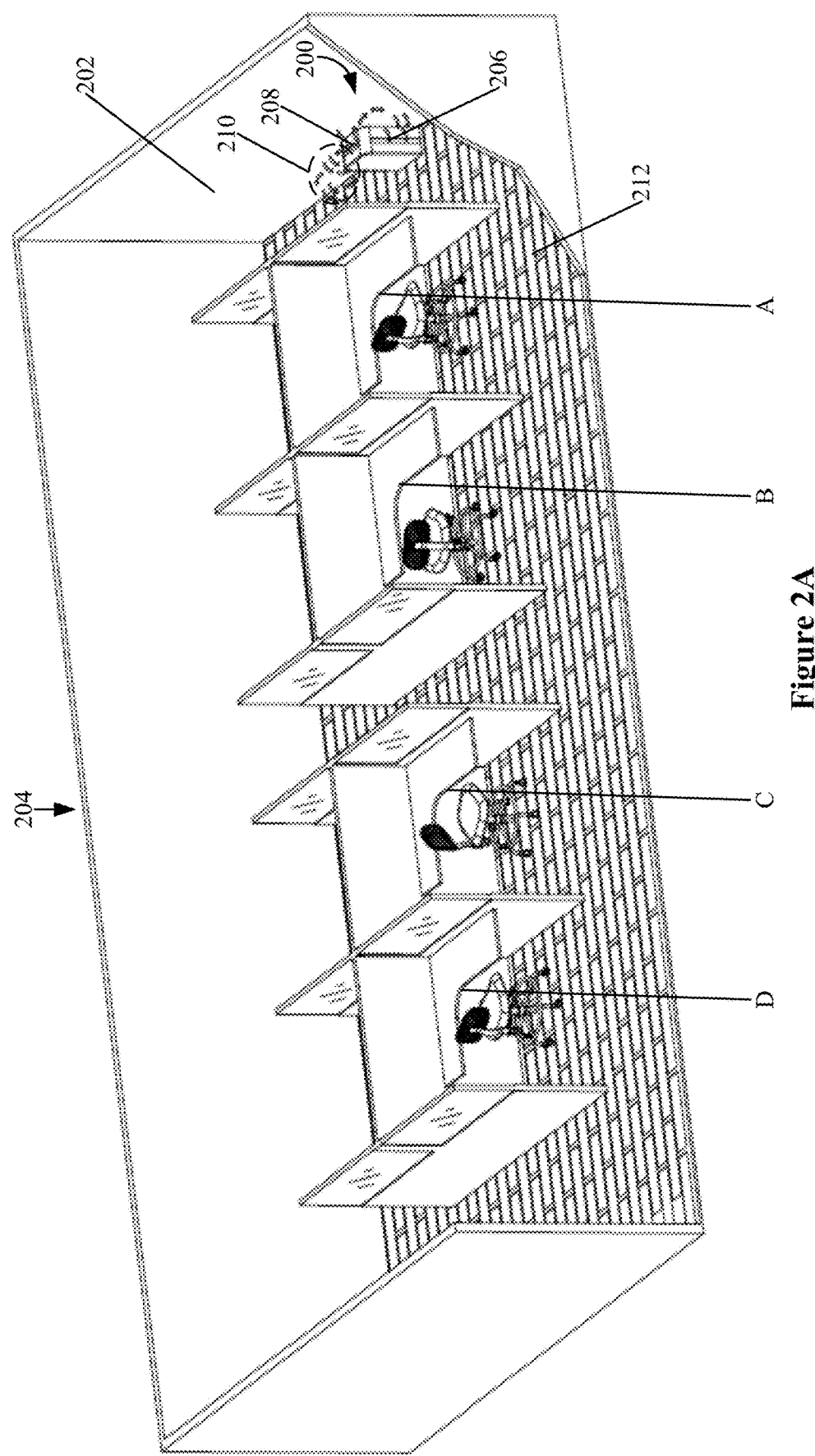
FIG. 2A illustrates a cubicle office configuration utilizing a conventional portable air filtration device.

FIG. 2A illustrates a cubicle office configuration utilizing a conventional portable air filtration device. Referring to FIG. 2A, a conventional portable air filtration device 200 may be positioned against a wall 202 in a cubicle office configuration 204. Because of the relatively short distance between the air intake 206 and the air outlet 208 and the relatively short air throw 210 (e.g., which is caused by a relatively low velocity of air being discharged at the air outlet 208) of the portable air filtration device 200, clean air is recirculated as opposed to dispersing clean air directly from the device to cubicle D. Furthermore, because the air intake 206 extends to the ground 212, suspension and/or resuspension of droplets that have already fallen below the occupied zone of air may occur and/or those droplets may be pulled into the air intake 206 (which reduces the useful life of the air filter). The height of the air outlet 208 is also too low (e.g., not above the occupied zone of air) to deliver clean air across the room before mixing with dirty air. Indeed, even if the portable air filtration device 200 may eventually clean the air in the cubicle office configuration 204, the initially clean air discharged from the air outlet 208 must pass the occupied zone of air across cubicle A, B, and C before reaching cubicle D. Therefore, if any person sitting in cubicle A, B, or C is discharging pathogens (e.g., is sick), the initially clean air will mix with the dirty air by the time it reaches a person sitting in cubicle D (which is an example of cross-contamination), rendering the portable air filtration device 200 ineffective for at least the person at cubicle D. Indeed, even if the portable air filtration device 200 included an air throw with an adequate velocity, the air would be pushed across potentially sick people before reaching everyone in the cubicle office configuration 204. It should be understood that these shortcomings are also present in a room without cubicles.

Figure 2B:
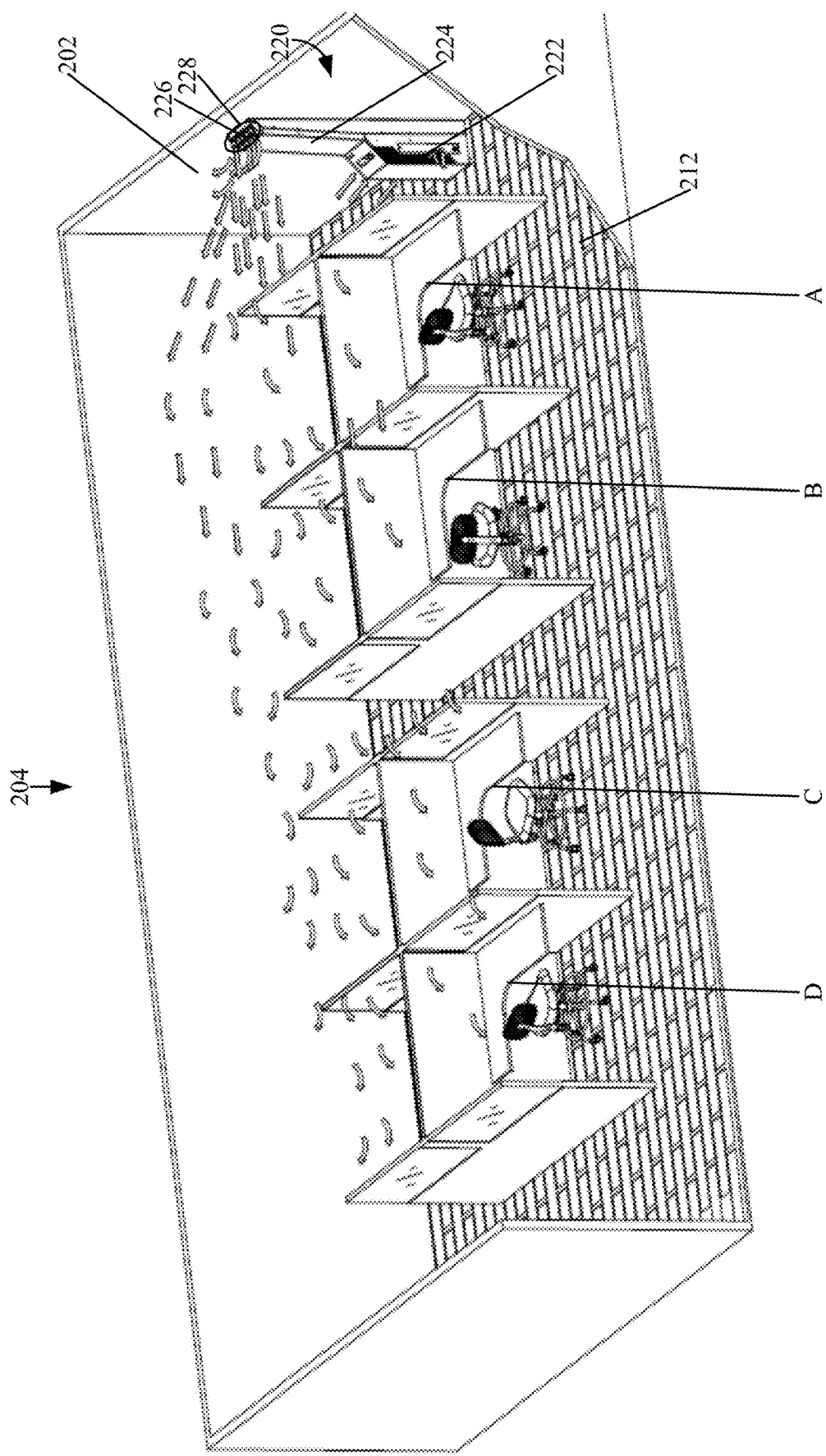
FIG. 2B illustrates a cubicle office configuration utilizing a portable air filtration and air dispersion device.

FIG. 2B illustrates a cubicle office configuration utilizing a portable air filtration and air dispersion device. Similar to a conventional air filtration device 200, a portable air filtration device 220 such as described herein is positioned against the wall 202 in the cubicle office configuration 204. However, unlike in the scenario of the conventional portable air filtration device 200, it is possible to provide effective air filtration. As illustrated in FIG. 2B, the portable air filtration device 220 pulls dirty air in via the air intake 222, through the air filter (not shown) and into the blower motor (not shown), which pushes the now clean air through the air duct 224 and out of the air outlet 226.

As described above with respect to FIGS. 1A-1E, the air outlet 226 discharges the air flow in a horizontal plane over an occupied zone from a region 228 of the air duct 224 having a vertical height that is less than or equal to twelve inches. Due to the volume and velocity of the clean air flow that is delivered above the occupied zone, clean air mixing zones are created throughout the entire cubicle office configuration 204 faster than conventional air filtration devices, ensuring clean air reaches every cubicle (e.g., cubicles A, B, C, and D) without the cross-contamination described above with respect to FIG. 2A. Therefore, even if a person is discharging pathogens (e.g., is sick) at one of the cubicles, A, B, C, or D, clean air can still reach the other cubicles without first mixing with dirty air. Furthermore, little to no clean air is recirculated next to the air filtration device 220 (e.g., in contrast to the device 200 described in FIG. 2A) and there are no dead zones in the occupied zone of the cubicle office configuration 204 due to the volume and velocity of the clean air flow delivered above the occupied zone. Indeed, the air filtration device 220 delivers clean air in seconds to every cubicle (e.g., cubicles A, B, C, and D) in the cubicle office configuration 204, whereas the air filtration device 200 described with respect to FIG. 2A may take several minutes/hours (if ever) before clean air actually reaches every cubicle (e.g., cubicles A, B, C, and D) in the cubicle office configuration 204.

Using known air calculations, the air filtration device 220 can be designed to produce at least 4 air changes per hour (ACH) in the room 204. Indeed, the following calculation results in the number of ACH:

$$ACH = \frac{60 \text{ min/hour}}{\left(\frac{\text{Volume of room in cubic feet}}{CFM}\right)}.$$

In some cases in which natural air flow is introduced into a room 204, the air filtration device 220 may be designed to produce less than 4 ACH. In some cases, such as when a room 204 is especially large, more than one air filtration device 220 may be required to reach at least 4 ACH. In some cases, the air filtration device 220 is designed to produce more than 4 ACH (e.g., 5, 6, 7, 8, 9, 10, 11, or 12 ACH).

Figures 3A, 3B:
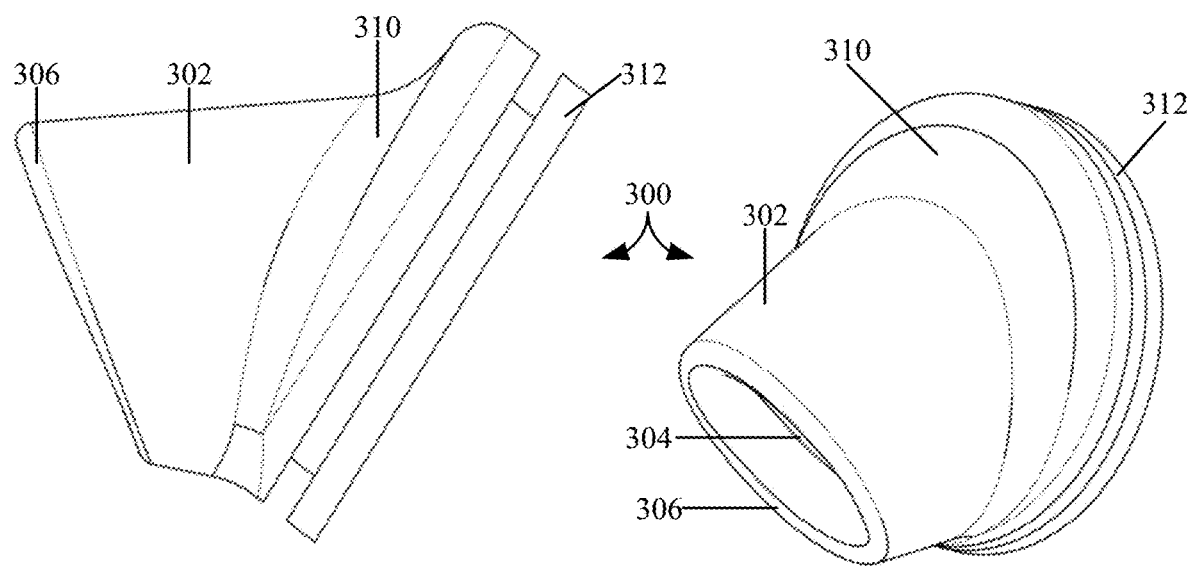
FIGS. 3A-3D illustrate views of a circular nozzle that may be used in an air filtration device as described herein.
Figures 3C, 3D:
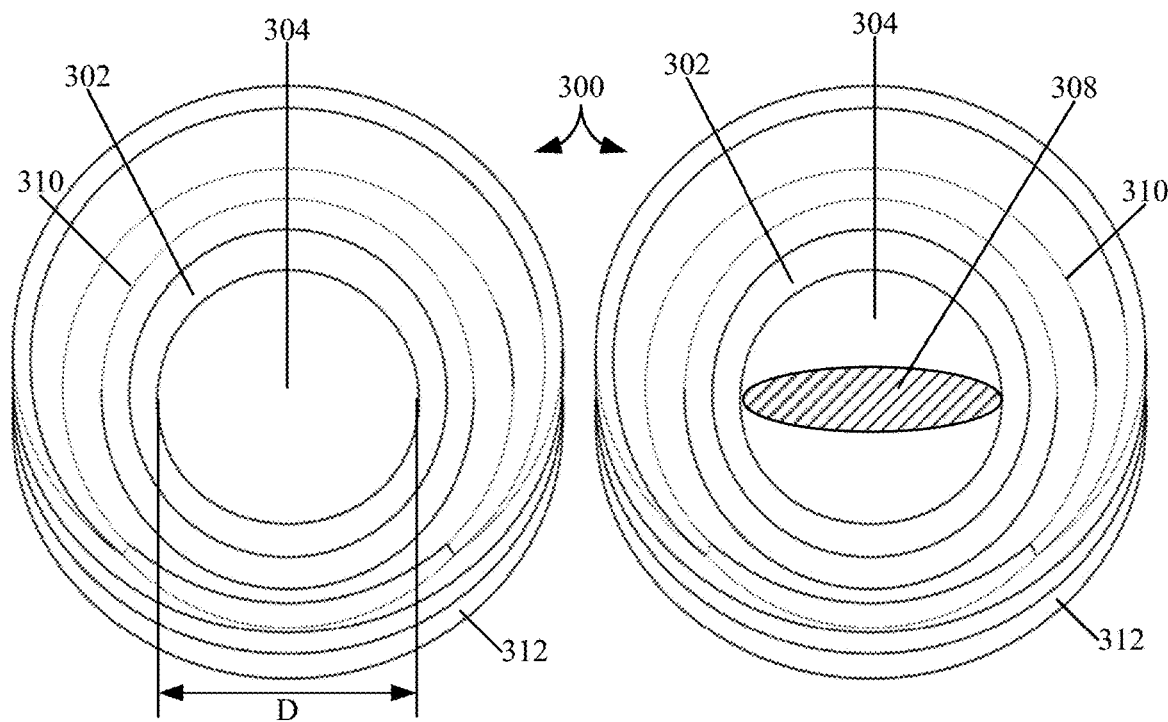

FIGS. 3A-3D illustrate views of a circular nozzle that may be used in an air filtration device as described herein. FIG. 3A illustrates a left side view of the circular nozzle; FIG. 3B illustrates a left side-angled view of the circular nozzle; FIG. 3C illustrates a front view of the circular nozzle; and FIG. 3D illustrates a front view of the circular nozzle having a valve. Referring to FIGS. 3A-3D, a circular nozzle 300 includes a spout 302 having an aperture 304 at a distal end 306. In this example, the aperture 302 has a diameter (D) due to the aperture's cylindrical shape; however, in some cases, the aperture may be any shape that allows the air flow provided by the blower motor (not shown in this Figure) to provide an adequate air throw, including, but not limited to, oval, elliptical, oblong, triangular, square, rectangular (as described below with respect to FIGS. 4A-4D), pentagonal, hexagonal, heptagonal, octagonal, and so on. Whatever the shape of the aperture 304, the spout 302 is designed to direct the air flow having a minimum volume (e.g., 350 CFM) and air velocity (e.g., 1,200 FPM) in a specific direction.

In some cases, as illustrated in FIG. 3D, the circular nozzle 300 may include a valve 308 that can effectively alter the shape/area of the aperture 304 of the spout 302, which causes a change in the volume and/or velocity of the air flow. When the valve 308 is fully opened, the blower motor pushes an air flow having a minimum volume (e.g., 350 CFM) and/or velocity (e.g., 1,200 FPM). When the valve 308 is fully closed, no air flow is permitted. It should be understood that the valve 308 may be adjustable between fully opened and full closed. The valve 308 may be any type of valve that permits the minimum volume and velocity of air flow to be discharged from the aperture 304, including but not limited to, a gate valve, a globe valve, a check valve, a plug valve, a ball valve, a butterfly valve, a needle valve, a pinch valve, a pressure relief valve, a knife valve, a pinch valve, and/or a solenoid valve.

The circular nozzle 300 also includes an adjustable directional portion 310 and a base 312. The adjustable directional portion 310 permits a range of motion for the direction of the adequate air throw. Specifically, the adjustable directional portion 310 allows manual and/or electronic adjustment of the direction of the spout 302. As an example, the adjustable directional portion 410 may provide twenty degrees of pitch rotation (e.g., ten degrees up and ten degrees down around the pitch axis) and 90 degrees of yaw rotation (e.g., 45 degrees to the left and 45 degrees to the right around the yaw axis). As another example, the adjustable directional portion 310 may provide thirty-six degrees of pitch rotation (e.g., eighteen degrees up and eighteen degrees down around the pitch axis) and 160 degrees of yaw rotation (e.g., 80 degrees to the left and 80 degrees to the right around the yaw axis).

Figures 4A, 4B:
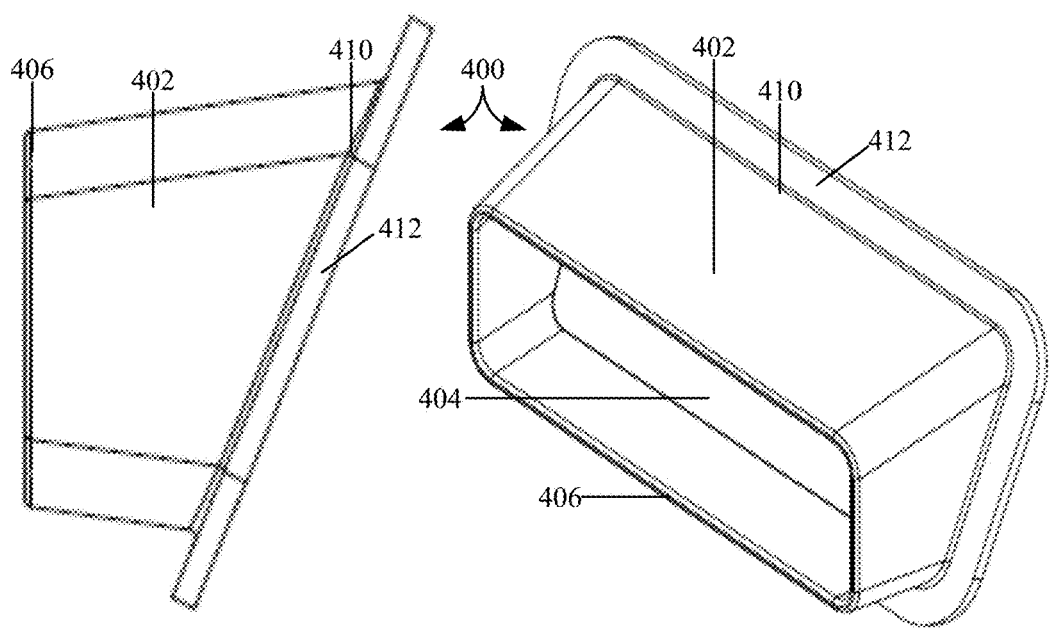
FIGS. 4A-4D illustrate views of a rectangular nozzle that may be used in an air filtration device as described herein.
Figure 4C:
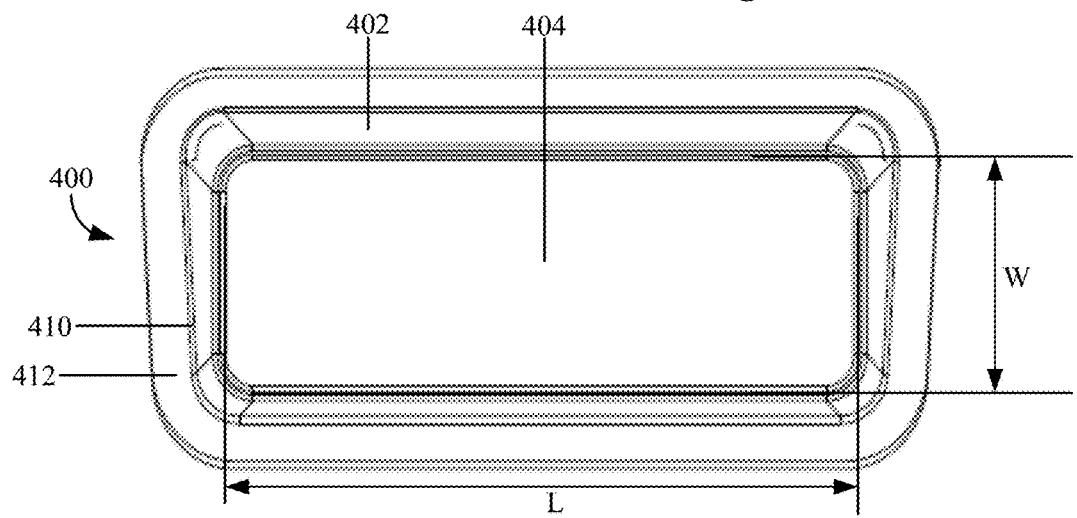
Figure 4D:
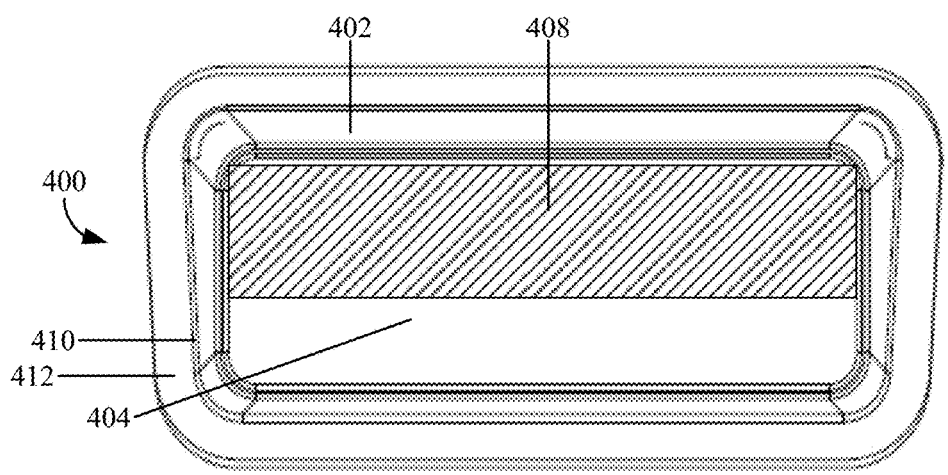

FIGS. 4A-4D illustrate views of a rectangular nozzle that may be used in an air filtration device as described herein. FIG. 4A illustrates a left side view of the rectangular nozzle; FIG. 4B illustrates a left side-angled view of the rectangular nozzle; FIG. 4C illustrates a front view of the rectangular nozzle; and FIG. 4D illustrates a front view of the rectangular nozzle having a valve. Referring to FIGS. 4A-4D, a rectangular nozzle 400 includes a spout 402 having an aperture 404 at a distal end 406. In this example, the aperture 404 has a length (L) and a width (W) due to the aperture's rectangular shape. As in other cases, the spout 402 is designed to direct the air flow having a minimum volume (e.g., 350 CFM) and air velocity (e.g., 1,200 FPM) in a specific direction.

In some cases, as illustrated in FIG. 4D, the rectangular nozzle 400 may include a valve 408 that can effectively alter the shape/area of the aperture 404 of the spout 402, which causes a change in the volume and/or velocity of the air flow. When the valve 408 is fully opened, the blower motor pushes an air flow having a minimum volume (e.g., 350 CFM) and/or velocity (e.g., 1,200 FPM). When the valve 408 is fully closed, no air flow is permitted.

The circular nozzle 400 also includes an adjustable directional portion 410 and a base 412. The adjustable directional portion 410 permits a range of motion for the direction of the adequate air throw. Specifically, the adjustable directional portion 410 allows manual and/or electronic adjustment of the direction of the spout 402. As an example, the adjustable directional portion 410 may provide twenty degrees of pitch rotation (e.g., ten degrees up and ten degrees down around the pitch axis) and 90 degrees of yaw rotation (e.g., 45 degrees to the left and 45 degrees to the right around the yaw axis). As another example, the adjustable directional portion 410 may provide thirty-six degrees of pitch rotation (e.g., eighteen degrees up and eighteen degrees down around the pitch axis) and 90 degrees of yaw rotation (e.g., 45 degrees to the left and 45 degrees to the right around the yaw axis).

Figure 5A:
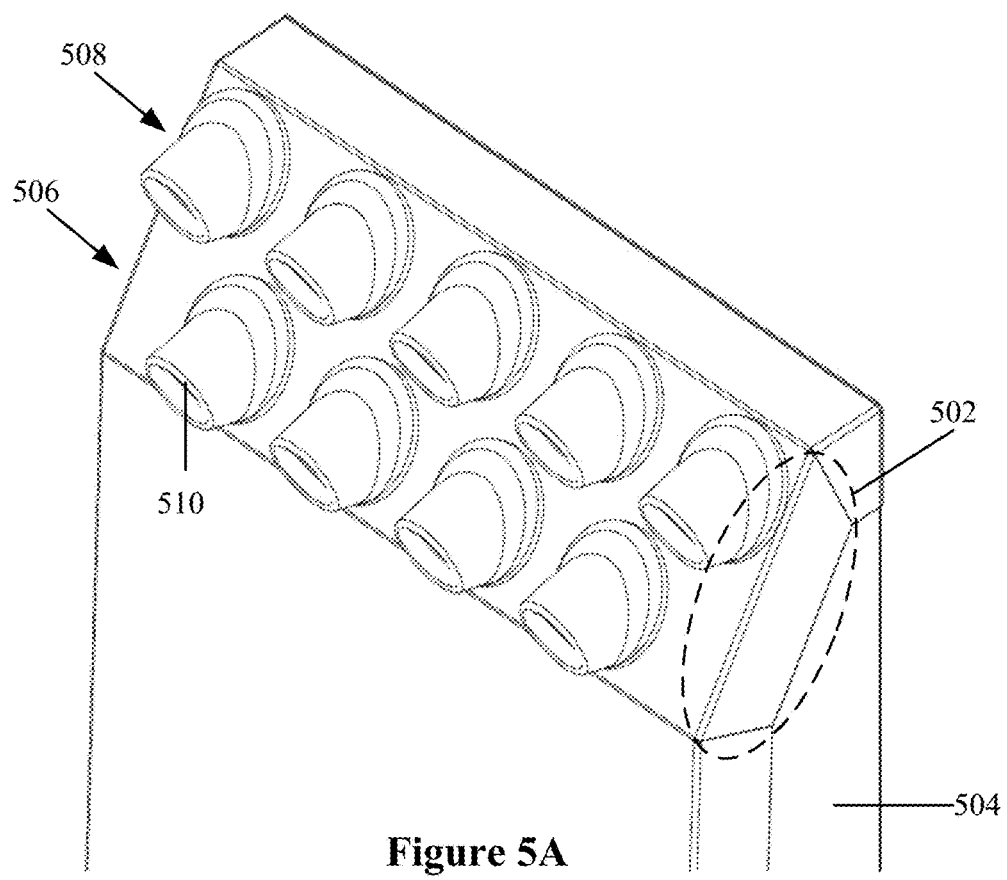
FIGS. 5A and 5B illustrate a plurality of nozzles of an air outlet of an air filtration device.
Figure 5B:
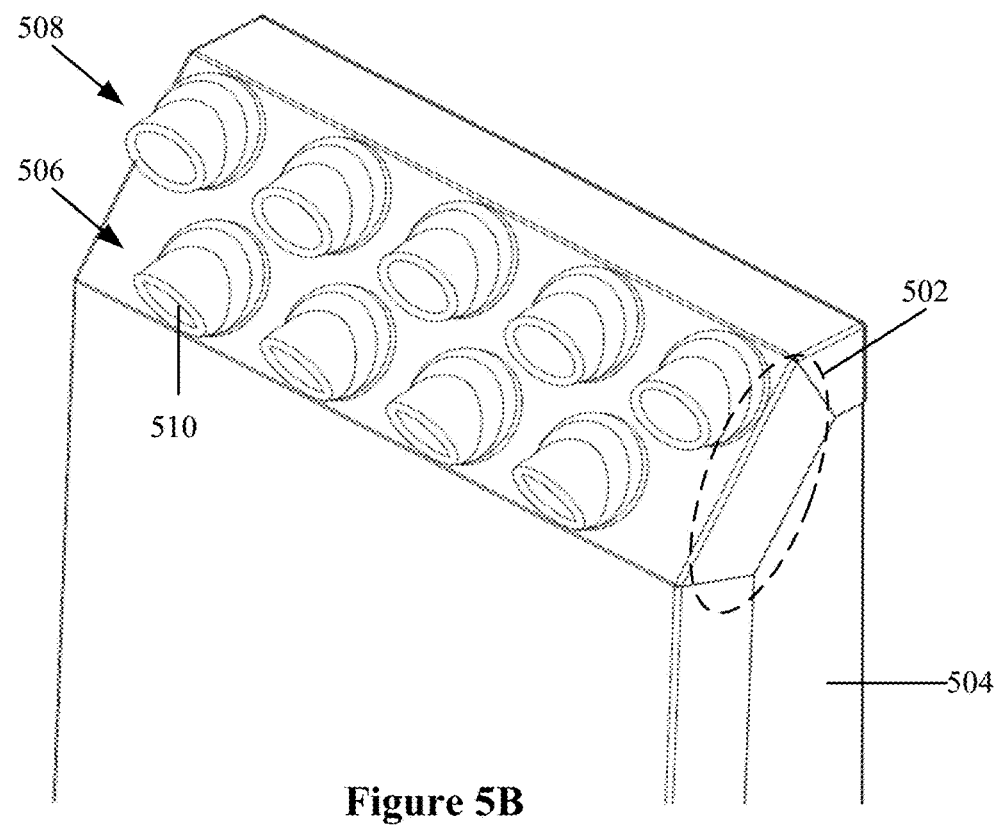

FIGS. 5A and 5B illustrate a plurality of nozzles of an air outlet of an air filtration device. Referring to FIGS. 5A and 5B, an air outlet is comprised of a plurality of nozzles 500 that includes four nozzles in a bottom row 502 and five nozzles in a top row 504. It should be understood that the volume of air flow from each of the plurality of nozzles 500 combined provides at least the minimum volume of air flow (e.g., 350 CFM), while each of the plurality of nozzles 500 individually provide the minimum velocity of the air flow (e.g., 1,200 FPM) to deliver an adequate air throw.

The number of nozzles and the capacity of the blower motor (e.g., blower motor 112 of FIG. 1E) may vary depending upon the minimum volume of the air flow and the minimum velocity of the air flow desired for the air filtration device. For example, in order to achieve a higher overall combined minimum volume of the air flow while maintaining the same and/or similar velocity of the air flow from each of the plurality of nozzles 500, a higher capacity blower motor may be incorporated. As another example, in order to achieve a lower combined minimum volume of the air flow while maintaining the same and/or similar velocity of the air flow from each of the plurality of nozzles 500, a lower capacity blower motor may be incorporated. As another example, in order to maintain the same or similar minimum volume of the air flow while achieving a higher velocity of the air flow from each of the plurality of nozzles 500, less nozzles may be incorporated. As another example, in order to maintain the same or similar minimum volume of the air flow while achieving a lower velocity of the air flow from each of the plurality of nozzles 500, more nozzles may be incorporated. As another example, a main valve may be incorporated to adjust the total air flow to the plurality of nozzles 500. It should be understood that one way of effectively changing the number of nozzles may be to simply open/close a nozzle through the use of an individual valve for that nozzle (e.g., as described with respect to FIGS. 3D and 4D).

The plurality of nozzles 500 can include additional nozzles by including additional nozzles at the bottom row 506 and/or the top row 508, by including additional rows of nozzles above and/or below the top and/or bottom row 506, 508, or by including nozzles/rows of nozzles facing other directions altogether. For example, the air filtration device 100 illustrated in FIG. 1 may have nozzles/rows of nozzles positioned to provide an adequate air flow for 180° of the horizontal plane, making the air filtration device 100 suited to be positioned against a wall. In other implementations, an air filtration device may have nozzles/rows of nozzles positioned to provide adequate air flow for 90° of the horizontal plane (e.g., in two directions perpendicular to one another), making the air filtration device suited to be positioned in a corner of a room. In still yet other implementations, an air filtration device may have nozzles/rows of nozzles positioned to provide adequate air flow for 360° of the horizontal plane (e.g., in four directions and/or elliptically), making the air filtration device suited to be positioned away from any walls in a room (e.g., in the middle of a room).

Referring back to FIGS. 5A and 5B, in some cases, each of the plurality of nozzles may provide directional adjustment of the airflow (e.g., such as described with respect to FIGS. 3A-3D and 4A-4D) individually. In some cases, each row 506, 508 of the plurality of nozzles 500 may provide directional adjustment of the airflow. Referring specifically to FIG. 5B, an end 510 of each of the nozzles in the bottom row 506 may be positioned at a 10° downward angle from horizontal, while the ends for each of the nozzles in the top row 508 may be positioned horizontally. In other words, if the bottom row 506 and/or the top row 508 of nozzles provide directional adjustment of the air flow, the entire bottom row 506 or the entire top row 508 can be moved in conjunction with one another. Referring back to FIGS. 5A and 5B in some cases, all of the plurality of nozzles 500 can be moved in conjunction with one another, regardless of whether a nozzle is in the top row 508 or the bottom row 506. In some cases, the region 502 of the air duct 504 may be rotatable 360° around the vertical axis to provide the air flow in any direction desired by a user of the air filtration device. In some cases, the bottom row 506 may be positioned between 2° to 18° downward angle from horizontal to overcome the rise of isothermal air exiting the plurality of nozzles 500 when encountering air within a room (e.g., outside the air filtration device). In some cases (e.g., in rooms with very high ceilings), the top row 508 may be positioned between 2° to 18° upward from horizontal.

Figure 5C:
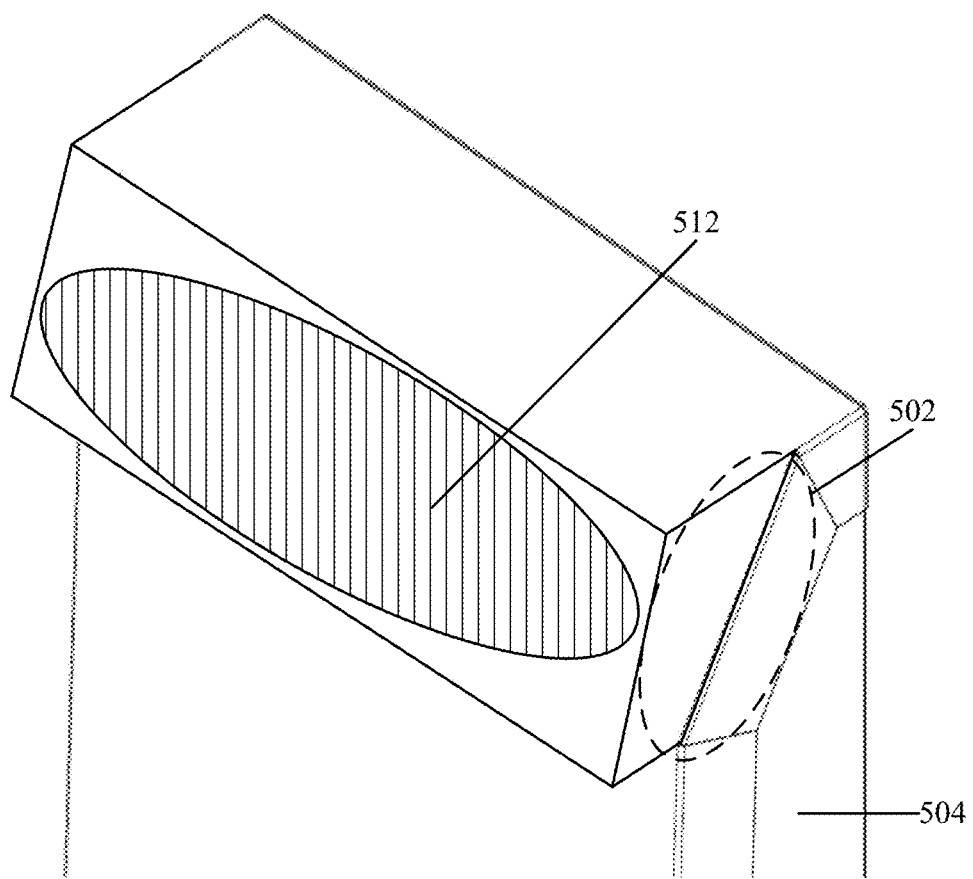
FIG. 5C illustrates a single aperture of an air outlet of an air filtration device.

FIG. 5C illustrates a single aperture of an air outlet of an air filtration device. Referring to FIG. 5C, an air outlet is comprised of a single aperture 512 that provides direction to the air flow created by the blower motor. In some cases, the region 502 of the air duct 504 having the single aperture 512 is rotatable 360° around the vertical axis to provide the air flow in any direction desired by a user of the air filtration device. In some cases, the single aperture 512 may be at least one nozzle. For example, the at least one nozzle may be one large nozzle; in other examples, the at least one nozzle may be a plurality of nozzles (e.g., plurality of nozzles 500). In some cases, the region 502 of the air duct 504 for the air outlet supports an interchangeable face to allow for various configurations of air outlets, including configurations that provide varying degrees of coverage about the horizontal plane above the occupied zone.

Figure 6:
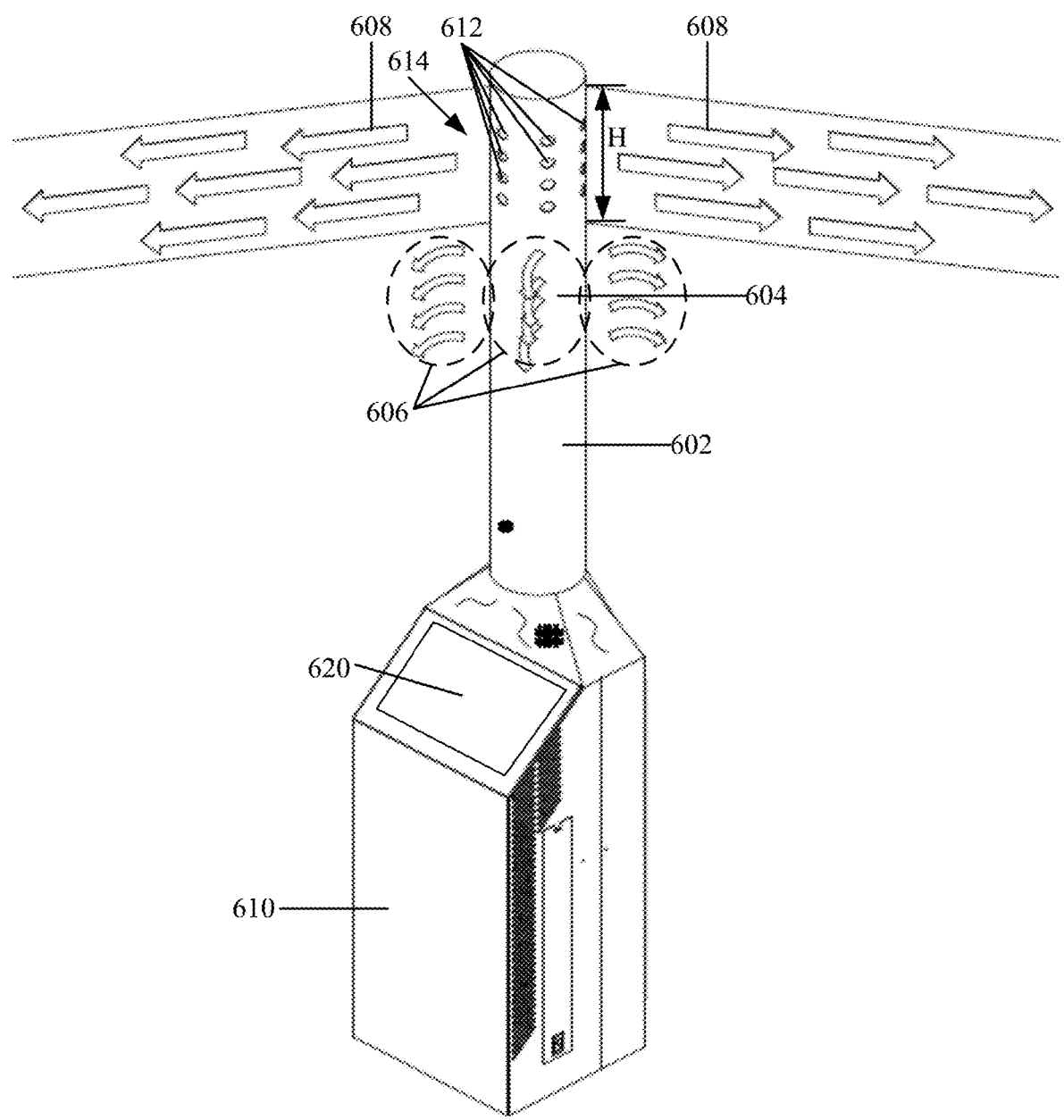
FIG. 6 illustrates a side-angled view of a portable air filtration device with an air duct made of semi-porous fabric.

FIG. 6 illustrates a side-angled view of a portable air filtration device with an air duct made of semi-porous fabric. Referring to FIG. 6, air filtration device 600 includes an air duct 602. A portion 604 of the air duct 602 is made of a semi-porous fabric. When the blower motor is in operation, some flow 606 of the air flow 608 (e.g., that has already been cleaned after passing through the housing 610 having the air filter) escapes through the semi-porous fabric. By having some flow 606 of the (clean) air flow 608 escape through the semi-porous fabric, users positioned directly beside the air filtration device 600 can receive a positive pressure air flow that may otherwise not be present directly beside the air filtration device 600 (e.g., due to the velocity of the air flow). However, due to that portion 604 of the air duct 602 being in the occupied zone, the some flow 606 of the clean air flow 608 that escapes that portion 604 of the air duct 602 has a velocity of less than 50 FPM.

The air filtration device 600 also illustrates an example of a plurality of apertures 512 (e.g., that make up the air outlet) positioned to provide adequate air flow 608 for 360° of the horizontal plane (e.g., elliptically), making the air filtration device 600 suited to be positioned away from any walls in a room (e.g., in the middle of a room). The plurality of apertures 612 discharge the air flow 608 in a horizontal plane over an occupied zone from a region 614 of the air duct 602 having a vertical height (H) that is less than or equal to twelve inches. In some cases, an air filtration device 600 (e.g., or any other air filtration device described above) may include a touch screen 620 that is controlled by a computing device (e.g., computing device 700 of FIG. 7) and allows a user to provide direct input to the air filtration device 600.

Figure 7:
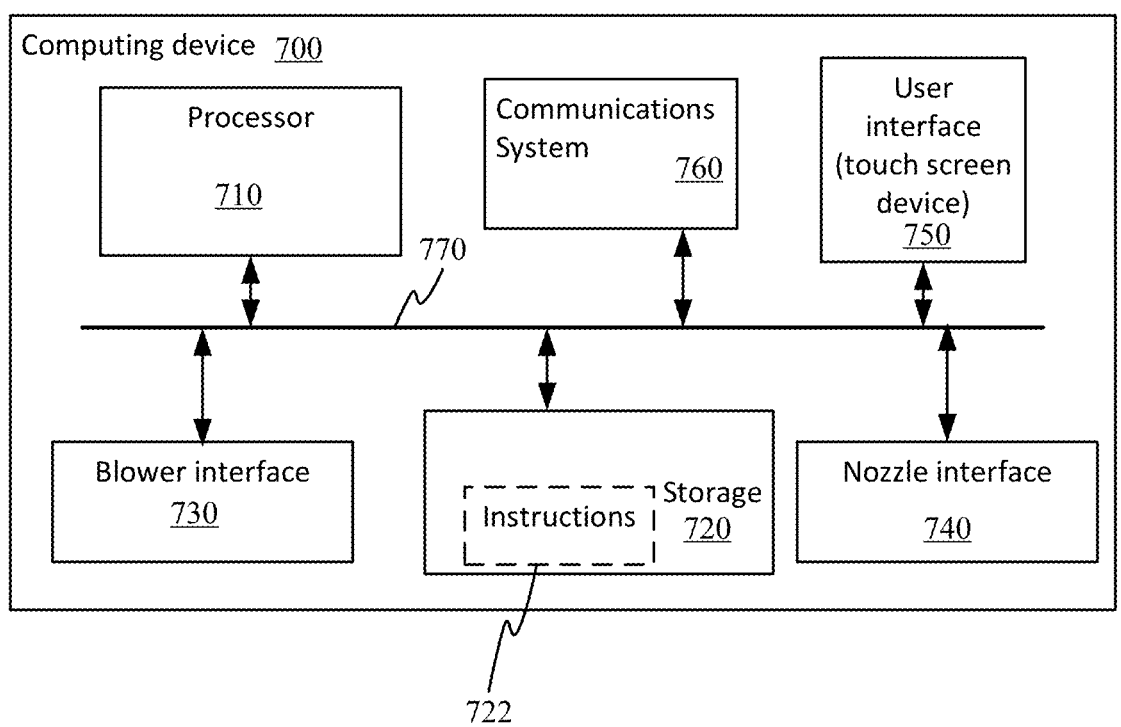
FIG. 7 illustrates a representational diagram of a computing device operating on an application management service for controlling at least one air filtration device.

FIG. 7 illustrates a representational diagram of a computing device of an air filtration device. An air filtration device (e.g., any of the air filtration devices described with respect to FIGS. 1A-1E, 2B, and FIG. 6 above) can include a computing device 700. In some cases, the computing device 700 may be referred to as an air filtration device controller and/or blower motor controller. The computing device 700 may be implemented as part of a building management system(s) and/or a building automation system(s).

Referring to FIG. 7, computing device 700 can include a processor 710, storage 720, blower interface 730, optional nozzle interface 740, user interface 750, and a communications system 760 coupled, for example, via a system bus 770. Processor 710 can include one or more of any suitable processing devices ("processors"), such as a microprocessor, central processing unit (CPU), graphics processing unit (GPU), field programmable gate arrays (FPGAs), application-specific integrated circuits (ASICs), logic circuits, and state machines. Storage 720 can include any suitable storage media that can store instructions 722 for controlling operation of the air filtration device. The instructions 722 providing the operations may be carried out as part of an application(s) for building management systems and/or building automation systems, including application(s) used for any widely used protocols, including BACnet (or vendor-specific platforms).

As used herein "storage media" do not consist of transitory, propagating waves. Instead, "storage media" refers to non-transitory media. Communications system 760 can include a network interface for coupling to the Internet or cellular service (e.g., for communicating with a service tied to a mobile application on a mobile device) and/or a short range interface (near field, wide band, or other common communication protocols) that can be used to communicate wirelessly with nearby devices. In some cases, sensors (e.g., as described above with respect to FIGS. 1A-1E) may also be in communication with the computing device 700 via an interface associated with the communications system 760 or via direct interfaces for those sensors (or general interfaces such as USB or firewire).

The user interface 750 can include a touch screen (e.g., touch screen 620 of FIG. 6) through which a user may initiate certain operations carried out by the processor 710 executing the instructions 722 stored on the storage 720.

The instructions 722 stored on the storage 720 are executed by the processor 710 to carry out control operations for the air purification device. The instructions 722 can cause the device to turn the blower motor of the air filtration device on, off, and/or to a room purge mode. The instructions 722 can also include adjusting the direction and/or volume of the air flow that is discharged from the air outlet (e.g., as described above with respect to FIGS. 3A-3D, 4A-4D and 5A-5C). This may include adjustment of individual apertures/nozzles or adjustment of all apertures/nozzles included in the air outlet.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An air filtration device comprising:
   a housing comprising an air intake;
   a blower motor mounted within the housing, wherein when the blower motor is in operation, the blower motor generates an air flow from the air intake through an air duct extending vertically from the housing;
   an air outlet at a distal end of the air duct, wherein the air outlet comprises at least one aperture, wherein when the blower motor is in operation, the air outlet discharges the air flow in a horizontal plane over an occupied zone from a region of the air duct having a vertical height that is less than or equal to twelve inches, wherein the region of the air duct for the air outlet is disposed at least thirty-six inches above the air intake, wherein the at least one aperture is configured to provide directional adjustment of the air flow; and
   an air filter mounted within the housing between the air intake and the air outlet.

2. The air filtration device of claim 1, wherein a top of the air filtration device is between seventy-eight inches to ninety-six inches from a bottom of the air filtration device.

3. The air filtration device of claim 2, wherein the air outlet is positioned within twelve inches from the top of the air filtration device.

4. The air filtration device of claim 2, where a top of the air intake is positioned forty-two inches from a bottom of the air filtration device.

5. The air filtration device of claim 1, wherein the blower motor generates an air flow of at least 350 cubic feet per minute (CFM).

6. The air filtration device of claim 5, wherein the at least one aperture of the air outlet discharges the air flow having a velocity of at least 1,000 feet per minute (FPM) in the horizontal plane.

7. The air filtration device of claim 1, wherein the at least one aperture of the air outlet is at least one nozzle.

8. The air filtration device of claim 7, wherein the at least one nozzle is a plurality of nozzles in a bottom row and a plurality of nozzles in a top row.

9. The air filtration device of claim 8, wherein ends of the plurality of nozzles in the bottom row are positioned between a two to eighteen-degree downward angle from horizontal.

10. The air filtration device of claim 8, wherein the vertical height from the bottom row to the top row is less than or equal to six inches.

11. The air filtration device of claim 1, wherein the at least one aperture is configured to provide volumetric adjustment of the air flow.

12. The air filtration device of claim 1, wherein a portion of the air duct is made of a semi-porous fabric.

13. The air filtration device of claim 1, further comprising a blower motor controller configured to turn the blower motor on and off.

14. The air filtration device of claim 1, further comprising an infrared sensor and a blower motor controller;
   wherein the infrared sensor sends a signal to a blower motor controller, wherein the blower motor controller determines whether a number of people present is more than a recommended number of people present based on the signal; and
   in response to determining that the number of people present is more than the recommended number of people present based on the signal, turning the blower motor to a room purge mode.

15. An air filtration device comprising:
   a housing comprising an air intake;
   a blower motor mounted within the housing, wherein when the blower motor is in operation, the blower motor generates an air flow of at least 350 cubic feet per minute (CFM) from the air intake through an air duct extending vertically from the housing;
   an air outlet at a distal end of the air duct, wherein the air outlet comprises at least one aperture, wherein when the blower motor is in operation, the air outlet discharges the air flow having a velocity of at least 1,000 feet per minute (FPM) in a horizontal plane over an occupied zone from a region of the air duct having a vertical height that is less than or equal to twelve inches, wherein the at least one aperture is configured to provide directional adjustment of the air flow; and
   an air filter mounted within the housing between the air intake and the air outlet.

16. The air filtration device of claim 15, wherein the at least one aperture of the air outlet is at least one nozzle.

17. The air filtration device of claim 16, wherein the at least one nozzle is configured to provide volumetric adjustment of the air flow.

18. The air filtration device of claim 16, wherein the region of the air duct for the outlet is disposed at least thirty-six inches above the air intake.

19. An air filtration device comprising:
   a housing comprising an air intake;
   a blower motor mounted within the housing, wherein when the blower motor is in operation, the blower motor generates an air flow from the air intake through an air duct extending vertically from the housing;
   an air outlet at a distal end of the air duct, wherein the air outlet comprises at least one aperture, wherein when the blower motor is in operation, the air outlet discharges the air flow in a horizontal plane over an occupied zone from a region of the air duct having a vertical height that is less than or equal to twelve inches, wherein the region of the air duct for the air outlet is disposed at least thirty-six inches above the air intake, wherein the at least one aperture is configured to provide volumetric adjustment of the air flow; and
   an air filter mounted within the housing between the air intake and the air outlet.

* * * * *